United States Patent [19]

Esserman et al.

[11] Patent Number: 5,144,664
[45] Date of Patent: Sep. 1, 1992

[54] APPARATUS AND METHOD FOR UPGRADING TERMINALS TO MAINTAIN A SECURE COMMUNICATION NETWORK

[75] Inventors: James N. Esserman, San Diego; Jerrold A. Heller, Del Mar, both of Calif.

[73] Assignee: General Instrument Corporation, Hatboro, Pa.

[21] Appl. No.: 614,940

[22] Filed: Nov. 16, 1990

[51] Int. Cl.⁵ .......................... H04L 9/14; H04L 9/16; H04N 7/167
[52] U.S. Cl. .......................................... 380/20; 380/2; 380/10; 380/21; 380/28; 380/43; 380/49
[58] Field of Search ................. 364/200, 900; 235/375; 380/2, 4, 5, 7, 10, 21, 22, 28–30, 43, 48, 50, 20, 30

[56] References Cited

U.S. PATENT DOCUMENTS

| | | | |
|---|---|---|---|
| 4,613,901 | 9/1986 | Gilhousen et al. | 380/20 |
| 4,716,588 | 12/1987 | Thompson et al. | 380/20 |
| 4,799,635 | 1/1989 | Nakagawa | 364/900 |
| 4,905,280 | 2/1990 | Wiedemer | 380/20 X |
| 4,910,773 | 3/1990 | Hazard et al. | 380/21 |

Primary Examiner—Bermarr E. Gregory
Attorney, Agent, or Firm—Barry R. Lipsitz

[57] ABSTRACT

A secure communication network serves a plurality of terminals grouped into different security categories. Each terminal includes a replaceable security element containing a security algorithm specific to the security category to which the terminal is assigned. Upon the breach of a particular security version, the security elements in the affected category are replaced with new elements containing a different algorithm. The security elements are relatively low cost, and can be replaced on an as needed or periodic basis to maintain system security.

22 Claims, 1 Drawing Sheet

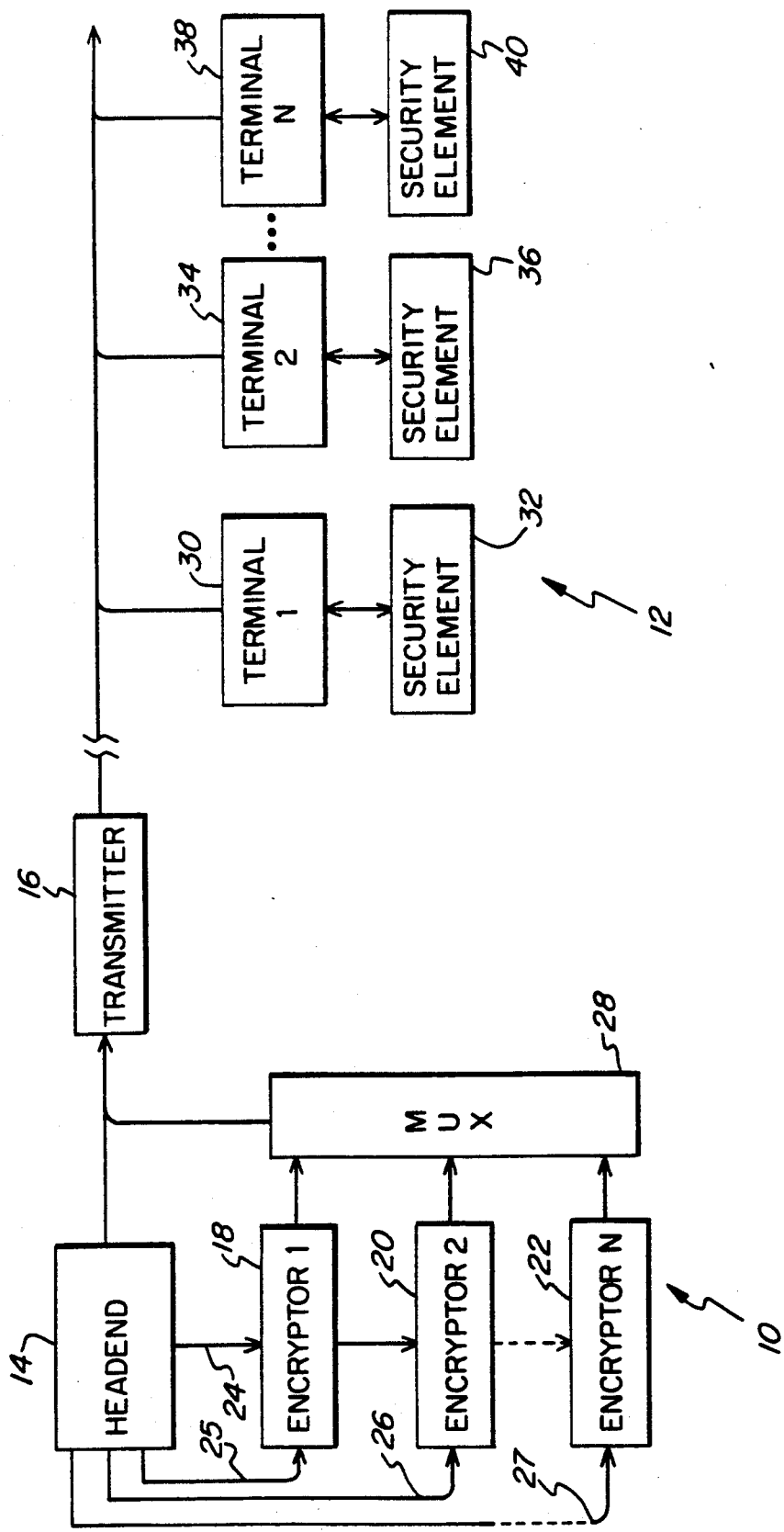

APPARATUS AND METHOD FOR UPGRADING TERMINALS TO MAINTAIN A SECURE COMMUNICATION NETWORK

BACKGROUND OF THE INVENTION

The present invention relates to a system for maintaining signal security in a communication network, and more particularly to a method and apparatus for fielding multiple versions of security in a subscription television system while maintaining signal scrambling compatibility.

There are many schemes for preventing the theft of signals in communication networks. Such networks can comprise, for example, subscription television systems including those that broadcast television programming by satellite or over cable. To date, no "unbreakable" security scheme has been developed. In the past, it has been difficult and expensive for a communication system operator to recover once the security of a system has been compromised. The wholesale replacement of existing subscriber terminals to implement a new security system each time an old system is breached is simply not practical.

Previous attempts to increase the difficulty of breaking a security system have, at best, only succeeded in extending the amount of time it takes to break the system.

It would be advantageous to provide a system wherein recovery from a security breach can be implemented with relative ease at a low cost. Such a system should preserve compatibility with an existing base of subscriber terminals. The system should also be easy to implement without inconvenience to subscribers.

The present invention provides a system having the aforementioned features and advantages.

SUMMARY OF THE INVENTION

A system is provided for upgrading a set of terminals in a communication network to maintain signal security. Signals are transmitted from a headend, which stores a plurality of encryption algorithms. Each algorithm is associated with a different subset of subscriber terminals authorized to receive the signals. Means are provided for scrambling the signals. One or more cryptographic keys are sent to different subsets of terminals using the different algorithms associated with the subsets. Upon the occurrence of an event, such as the breach of a security version relying on a particular algorithm, the transmission of keys encrypted under the particular algorithm is terminated. The terminated algorithm is replaced at the headend with a new algorithm for use in encrypting keys for the subset of terminals previously associated with the terminated algorithm. Security means provide a corresponding replacement algorithm for use by the terminals previously associated with the terminated algorithm.

The security means can comprise a replaceable security element associated with each terminal in the system. The replaceable security element for each terminal in a subset contains a decryption algorithm corresponding to the encryption algorithm associated with the subset. The security elements process data signals that are received by the terminals to provide working keys for use by the terminals in recovering (e.g., descrambling) information signals such as television program signals.

In accordance with the present invention, the working keys provided by the replaceable security elements are all identical. In this manner, only one scrambled signal must be transmitted to the whole population of terminals. In a preferred embodiment, the decryption algorithm contained in the replaceable security element is implemented in hardware, to frustrate the efforts of those attempting to break the security and replicate security elements.

A default decryption algorithm can be provided in each subscriber terminal. The default algorithm is used to decrypt received signals when a corresponding default algorithm is used to encrypt the signals at the headend, for instance, in order to enable descrambling while compromised security elements are being returned to the system operator for an upgrade.

Each encryption algorithm has a cryptographic key associated therewith. Each time an algorithm is terminated, its associated cryptographic key can be replaced with a new key associated with the replacement algorithm. However, the keys can remain the same for all of the algorithms in the most basic embodiment. Means are provided for transmitting the keys in an encrypted form to the terminals.

A terminal is provided for use in the system of the present invention. The terminal includes means for receiving the signals transmitted by the headend, and a replaceable security element operatively associated with the receiving means for decrypting received signals. The replaceable security element contains a decryption algorithm corresponding to one of the encryption algorithms at the headend. The terminal also includes means for receiving and storing one or more cryptographic keys to be decrypted by its decryption algorithm.

A method for upgrading terminals to recover from security compromises in a secure communication network is also disclosed. Encrypted signals are transmitted to different subsets of terminals using a different encryption algorithm for each subset. The terminals in each subset are provided with a corresponding decryption algorithm. A replacement encryption algorithm is provided for a particular subset upon the occurrence of an event, such as the compromise of a security element or the decryption algorithm contained therein. A corresponding replacement security element and decryption algorithm is provided to each of the terminals in the compromised subset.

The decryption algorithms for each of the subsets are contained in replaceable security elements provided to corresponding terminals. The security elements process the encrypted signals to provide working keys for their respective terminals. In order to preserve compatibility with other security versions when a subset of terminals is upgraded to a new security version, the system is designed such that the working keys provided by all the various security elements are identical.

In another embodiment, the decryption algorithm used by all of the subsets of terminals can be the same. However, each subset of terminals is associated with a different set of security elements that provide different versions of security for data necessary to decrypt received signals. For example, each set of security elements can use a different technique to protect secret information, such as cryptographic seeds contained in the security elements, from discovery. Once a method used to protect secret information is defeated, that method is abandoned and security elements containing new secret information protected by a new technique are distributed.

BRIEF DESCRIPTION OF THE FIGURE

The FIGURE is a block diagram illustrating the signal transmission and receiving ends of a communication network in accordance with the present invention.

DETAILED DESCRIPTION OF THE INVENTION

Apparatus for scrambling and selectively descrambling television signals that are transmitted to subscription television subscribers is known in the art. One such system, which the present invention improves upon, is disclosed in U.S. Pat. No. 4,613,901 to Gilhousen, et al, entitled "Signal Encryption and Distribution System for Controlling Scrambling and Selective Remote Descrambling of Television Signals", incorporated herein by reference.

Systems such as that described in the aforementioned patent provide a single version of security for the transmitted signals. A single version security system results in substantial exposure for a subscription television operator once the security has been compromised. In particular, the compromised security version must be upgraded, usually by replacing an entire universe of subscriber terminals or at least a substantial portion of the circuitry in each terminal.

Single version security systems also provide attackers ("pirates") a significant market since all users of the system have the same security. Once an attacker breaks the security, he can offer all users of the system "black boxes" or other devices to receive signals without payment to the system operator.

The present invention mitigates the problem by providing several versions of a noncompromised security system at the same time. Thus, when a break occurs, only a fraction of the population has to be upgraded to maintain security throughout the system. New versions of security can be fielded as needed after a prior version is broken, or the new versions can be provided on a periodic basis even if the version to be replaced is still secure. In order to effectively implement such a system, it is important that compatibility be preserved among the different systems, so that the introduction of a new security system will not render previous versions still in the field inoperable.

A system in accordance with the present invention is illustrated in the figure. Components generally designated 10 are provided at the system headend (i.e., transmission end of the communication network) and components generally designated 12 are provided at the receiving end of the communication network. For satellite television networks, the signals are broadcast from the headend to subscribers via satellite. In a cable television implementation, signals are provided from the transmitter to the subscriber terminals via cable. Those skilled in the art will appreciate that the present invention will also have application in other communication networks, such as those that distribute information for a fee to computer terminals.

A headend 14 in accordance with the present invention outputs program signals (e.g., scrambled television video and audio) together with various control and addressing data to a transmitter 16. Headend 14 also provides data signals for use in generating working keys on line 24, for encryption by a plurality of encryptors 18, 20, ... 22. Each of the encryptors will encrypt the data on line 24 in accordance with a different encryption algorithm to support different versions of security for different sets of subscriber terminals. Each of the encryption algorithms is associated with a different subset of subscriber terminals authorized to receive the signals. Headend 14 also provides a cryptographic key to each of the encryptors on lines 25, 26 and 27. Each encryptor encrypts the data from line 24 with its cryptographic key using its unique algorithm.

The encrypted data is output to a multiplexer 28 that combines the data into a signal for transmission by transmitter 16 together with the various signals output from headend 14.

At the receiving end, subscriber terminals 30, 34, ... 38 receive the transmitted signals. Each terminal has a respective security element 32, 36, ... 40 connected to it. The security elements are easily replaceable by the subscriber, and can comprise, for example, a "smart card" credit card size device or a plug-in cartridge.

The terminals provided to the universe of system subscribers are all the same, except for a unique identity assigned during manufacture or subsequently by a system operator. Through the security element they receive, they are grouped into various subsets. Each subset represents a different security version that requires a specific decryption algorithm for decrypting signals from one of the encryptors at the headend. If a security version is compromised, the encryptor serving the compromised subset of terminals is replaced with an encryptor having a new security algorithm. The security elements for each of the terminals in the compromised subset are also replaced. The replacement security elements contain decryption algorithms that correspond to the encryption algorithm used in the new encryptor. Thus, in order to recover from a security breach, only those security elements connected to terminals within the breached subset need to be replaced. By simultaneously fielding multiple security versions through the use of low cost security elements served by a plurality of encryptors, the cost of recovery from a particular security breach is reduced.

In order to enable terminals to be used during the transition from one security version to another (e.g., after the first has been compromised), the headend can send signals from both the old encryptor and the new encryptor during a transition period. After all of the security elements for the compromised version have been replaced, transmission from the old encryptor is terminated. Alternately, the terminals can all contain a default decryption algorithm that is functional during the transition period by virtue of the headend transmitting compatible signals during the transition. The default algorithm can be the first security version fielded in the system, enabling the terminals to decrypt incoming signals without any security element installed.

The present invention can be advantageously used in a satellite television system that transmits scrambled television signals for receipt by authorized subscribers having the necessary satellite reception equipment. In a satellite television system marketed by the VideoCipher Division of General Instrument Corporation, details of which are disclosed in the aforementioned U.S. Pat. No. 4,613,901, a "working key" signal is generated by processing an initialization vector signal in accordance with the data encryption standard ("DES") algorithm upon the algorithm being keyed by a common category key signal. A unique scrambling key stream is generated by processing the initialization vector signal in accordance with the DES algorithm upon the algorithm being keyed by the working key signal. A television signal is scrambled in accordance with the scrambling key stream. A plurality of unique encrypted category key signals individually addressed to different selected subscriber descramblers are generated by encrypting the initial common category key signal in accordance with the DES algorithm upon the algorithm being keyed by a plurality of different "unit key" signals unique to different selected descramblers. The unit key for each subscriber descrambler is derived from "seeds" uniquely associated with that descrambler. The scrambled television signal, the initialization vector signal, and the plurality of encrypted category key signals are broadcast to the descramblers. DES algorithms are employed at the descramblers to reproduce the encryption key stream and descramble the television signal in accordance therewith. As noted above, each descrambler has its unique unit key derived from its seeds, which unit key is stored in a secure memory for use in reproducing the common category key signal when the descrambler is addressed by its unique encrypted category key signal.

As indicated, each terminal in accordance with the present invention is supported by its own security element which is replaced upon the occurrence of an event. Typically, the event will be when the security version is compromised. Alternately, the security elements can be replaced on a periodic schedule whether or not their security has been broken. Each different security element is isolated in its own category by a unique category key that is periodically changed for each category. The category key for each security version is the same cryptographic key that is input to the associated encryptor by headend 14 via lines 25, 26 and 27. The data from headend line 24 that is encrypted by the encryptors can comprise, for example, a "program key" equivalent to the "channel key" described in U.S. Pat. No. 4,613,901.

The category keys are distributed by the system operator to each subscriber terminal on an individual basis. This is accomplished by addressing the keys to each terminal in a conventional manner. Since the system operator will know in advance which security category each subscriber terminal resides in, the proper category keys for each subset of terminals can be easily communicated. If a particular security version is compromised, the distribution of encrypted category keys and encrypted program keys to all compromised security elements will be terminated after all such security elements have been upgraded with a new and secure version.

Since each subset of terminals has its own category key and encryption algorithm, no more than one subset should be compromised at any one time. An important aspect of the present invention is that even though all subsets are isolated, they will all produce the same initialization vector ("working key") to a key stream generator, thereby preserving compatibility. Further, once a compromised subset is upgraded to a new encryption algorithm and category key, pirates will no longer be able to use the old security elements containing previous versions of encryption algorithms.

The security elements used in connection with the present system can be relatively simple. Upon receipt of the encrypted category key, they can decrypt the key for use in decrypting a received program key. Then, the program key is used to generate a working key. The working key is communicated in an encrypted form to the associated subscriber terminal for use in descrambling a received television program signal. An example of a security element that can be used in connection with the present invention is disclosed in commonly assigned, co-pending U.S. patent application Ser. No. 07/568,990, filed on Aug. 17, 1990 and entitled "Information Processing Apparatus with Replaceable Security Element".

In an alternate embodiment, the decryption algorithm can be the same or different for each security element version. However, each version of security element uses a different technique to protect secret information, such as cryptographic seeds contained in the security element, from discovery. One such technique is disclosed in commonly assigned, co-pending U.S. patent application Ser. No. 07/592,650 of Robert Gilberg, Chinh Hoang, and James E. Smith filed on Oct. 4, 1990 and entitled "Prevention of Inspection of Secret Data Stored in Encapsulated Integrated Circuit Chip", now U.S. Pat. No. 5,053,992, which concerns a method for causing the destruction of data on an integrated circuit chip upon exposure to light. Once a given protection technique is defeated, that method is abandoned and new security elements with new secret information required for signal decryption are distributed. The new security elements will have the secret information protected by an as yet undefeated technique.

It should now be appreciated that the present invention provides a method and apparatus for upgrading terminals to recover from security compromises in a secure communication network. Different categories of terminals employ different algorithms for decrypting cryptographic data necessary to decipher a received information signal. When the security of a category is breached, a security element in the affected terminals is replaced to provide a new security version.

Although the invention has been described in connection with a preferred embodiment, those skilled in the art will recognize that various adaptations and modifications may be made thereto without departing from the spirit and scope of the invention, as set forth in the following claims.

What is claimed is:

1. A system for revising a set of terminals in a communication network to maintain signal security comprising:

a headend for transmitting signals;

encryption means operatively associated with said headend for encrypting said signals according to a plurality of encryption algorithms, each algorithm associated with a different subset of terminals authorized to receive said signals;

means for selectively terminating the transmission of said signals under a particular algorithm;

means for providing a replacement algorithm in said encryption means for use instead of the terminated algorithm; and security means for providing a corresponding replacement algorithm to the subset of terminals associated with the terminated algorithm.

2. A system in accordance with claim 1 further comprising:

a cryptographic key associated with each algorithm; and means for transmitting each key in an encrypted form to the terminals associated with the algorithm to which the key is associated.

3. A system in accordance with claim 2 wherein a different cryptographic key is associated with each one of said algorithms; and
   means are provided for replacing the cryptographic key associated with said terminated algorithm with a new cryptographic key associated with the replacement algorithm.

4. A system in accordance with claim 1 wherein:
   said security means comprises a replaceable security element associated with each terminal in the system; and
   the replaceable security element for each terminal in a subset contains a decryption algorithm corresponding to the encryption algorithm associated with the subset.

5. A system in accordance with claim 4 wherein:
   said replaceable security elements process said signals to provide working keys for their respective terminals.

6. A system in accordance with claim 5 wherein:
   the working keys are all identical.

7. A system in accordance with claim 4 wherein said decryption algorithm is implemented in hardware.

8. A system in accordance with claim 1 wherein each terminal comprises a default decryption algorithm for use in decrypting received signals encrypted by a corresponding default encryption algorithm at the headend.

9. A terminal for use in the system of claim 1 comprising:
   means for receiving said signals; and
   a replaceable security element operatively associated with said receiving means for decrypting received signals;
   wherein said replaceable security element comprises a decryption algorithm corresponding to one of said encryption algorithms.

10. A terminal in accordance with claim 9 further comprising:
    a default decryption algorithm for use in decrypting received signals encrypted by a corresponding default encryption algorithm at the headend.

11. A terminal in accordance with claim 9 further comprising:
    means for receiving and storing a cryptographic key associated with said decryption algorithm; and
    means for receiving and storing a replacement cryptographic key upon replacement of said security element with a new security element;
    wherein said replacement key is associated with a new decryption algorithm in the new security element.

12. A method for revising a set of terminals to recover from security compromises in a secure communication network comprising the steps of:
    transmitting encrypted signals to different subsets of terminals using a different encryption algorithm for each subset;
    providing the terminals in each subset with a corresponding decryption algorithm;
    providing a replacement encryption algorithm for a particular subset upon the occurrence of an event; and
    providing a corresponding replacement decryption algorithm to each of the terminals in said particular subset.

13. A method in accordance with claim 12 comprising the further step of:
    providing said replacement decryption algorithm in replaceable security elements for distribution to each of the terminals in said particular subset.

14. A method in accordance with claim 13 wherein:
    the security elements process the encrypted signals to provide working keys for their respective terminals.

15. A method in accordance with claim 14 wherein:
    the working keys are all identical.

16. A method in accordance with claim 13 wherein said event is a compromise of the security element for said particular subset.

17. A method in accordance with claim 12 wherein said transmitted signals comprise a different cryptographic key for each different encryption algorithm, said method comprising the further step of:
    providing a new cryptographic key for use with said replacement encryption algorithm.

18. A method in accordance with claim 12 comprising the further step of:
    providing each terminal with a default decryption algorithm for use in decrypting received signals encrypted by a corresponding default encryption algorithm.

19. A system for revising a set of terminals in a communication network to maintain signal security comprising:
    means for encrypting signals for transmission;
    a headend operatively associated with said encryption means for transmitting said signals to different subsets of said terminals; and
    a different set of replaceable security elements associated with each subset of terminals, each set of security elements providing a different security algorithm for decrypting said signals at the terminals.

20. A system in accordance with claim 19 wherein each set of security elements uses a different decryption algorithm corresponding to one of a plurality of encryption algorithms used by said encrypting means.

21. A system in accordance with claim 19 wherein each set of security elements uses a different technique to protect information contained in the security elements from discovery.

22. A system in accordance with claim 21 wherein said techniques destroy a security element upon an attempt to discover said information therefrom.

* * * * *